Figure 1:
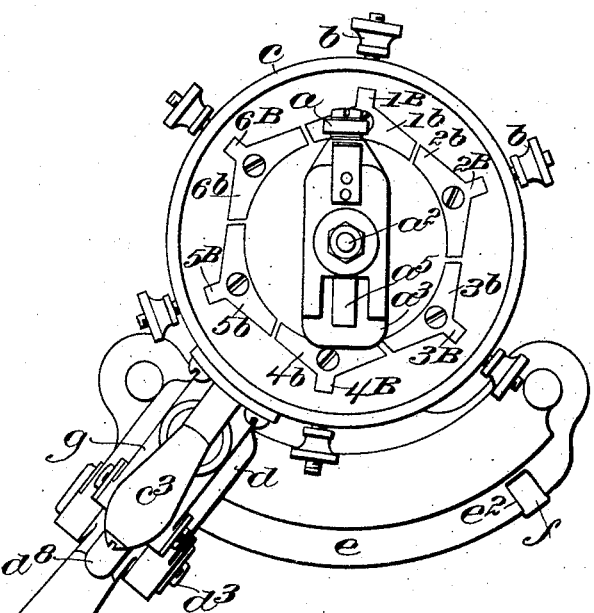

W. B. S. WHALEY & E. P. ROBINSON.
IGNITION TIMER.
APPLICATION FILED MAR. 25, 1910.

1,039,867.

Patented Oct. 1, 1912.

4 SHEETS—SHEET 1.

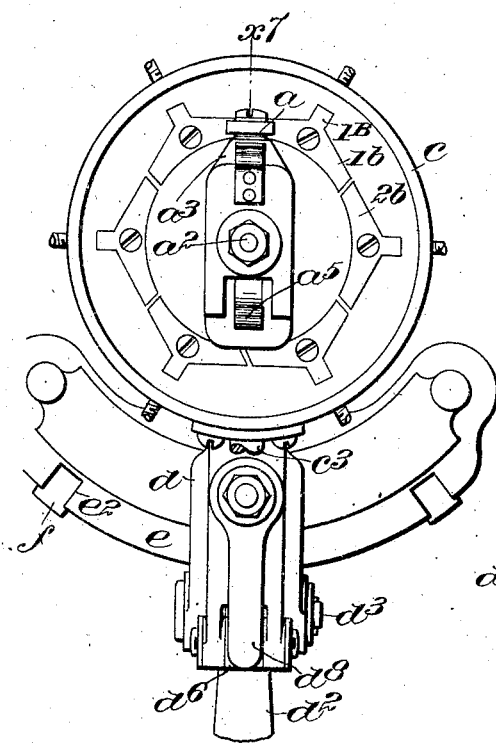
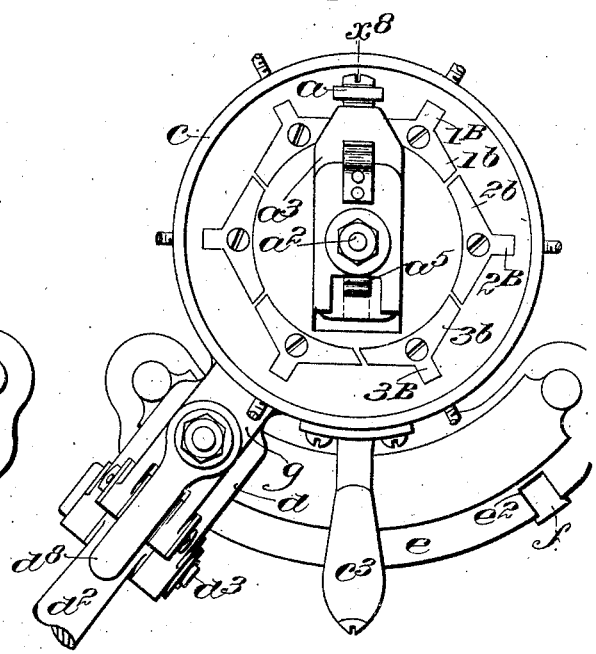
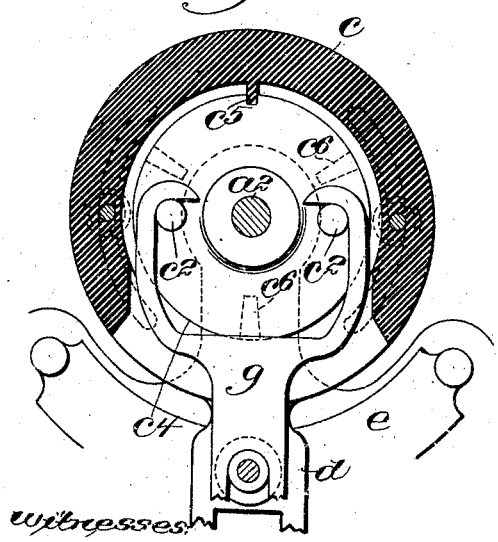
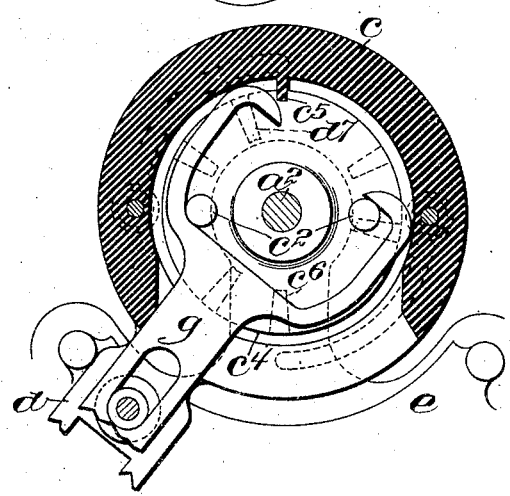

W. B. S. WHALEY & E. P. ROBINSON.
IGNITION TIMER.
APPLICATION FILED MAR. 25, 1910.
1,039,867.
Patented Oct. 1, 1912.
4 SHEETS—SHEET 3.
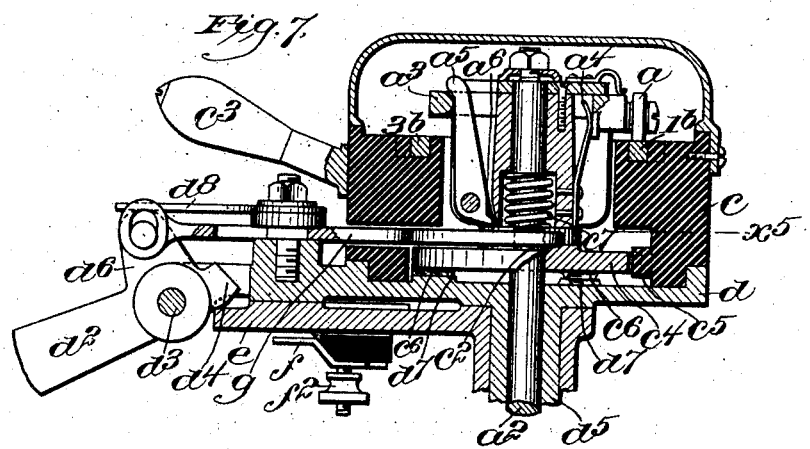
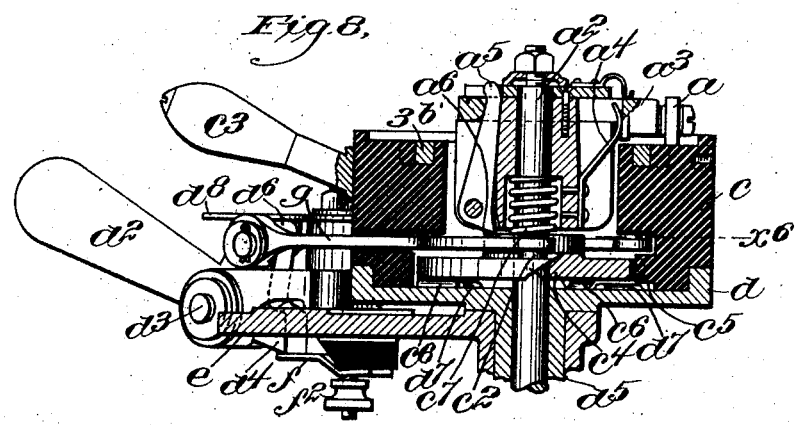
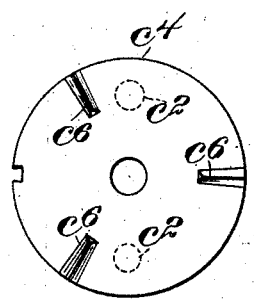
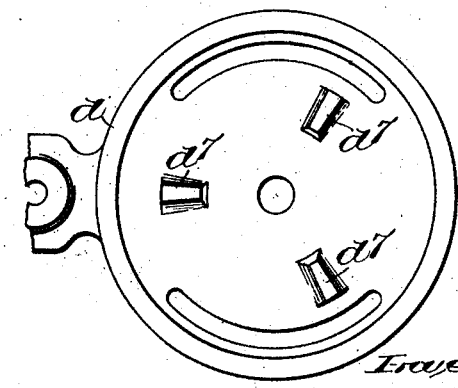
Witnesses:
Inventors:
W. B. Smith Whaley
Edward P. Robinson,
by Livermore Atty.

W. B. S. WHALEY & E. P. ROBINSON.
IGNITION TIMER.
APPLICATION FILED MAR. 25, 1910.
1,039,867.
Patented Oct. 1, 1912.
4 SHEETS—SHEET 4.
Fig. 11.
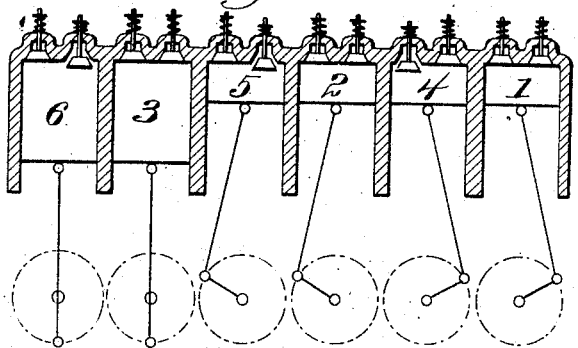
Fig. 12.
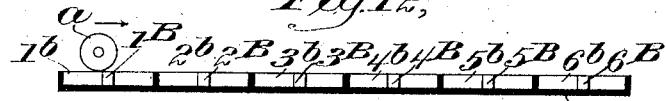
Fig. 13.
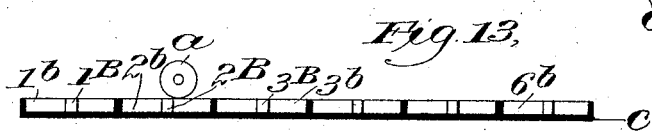
Fig. 14.
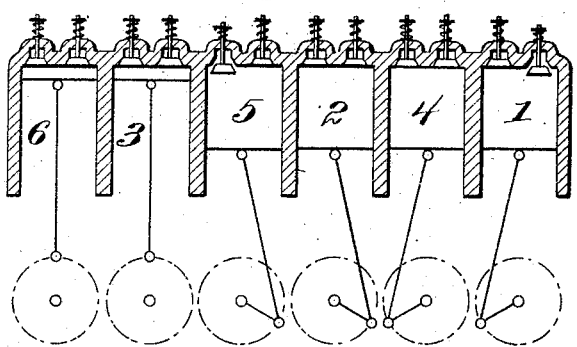
Fig. 15.
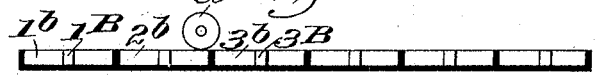
Fig. 16.
Fig. 17. Fig. 18.
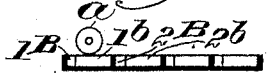
Witnesses:
Inventors:
W. B. Smith Whaley
& Edward P. Robinson,
by H. J. Swinnow Atty.

UNITED STATES PATENT OFFICE.

WILLIAM B. SMITH WHALEY, OF NEWTON, AND EDWARD P. ROBINSON, OF MALDEN, MASSACHUSETTS, ASSIGNORS TO REVERSIBLE GAS-ENGINE COMPANY, A CORPORATION OF MAINE.

IGNITION-TIMER.

1,039,867. Specification of Letters Patent. Patented Oct. 1, 1912.

Application filed March 25, 1910. Serial No. 551,605.

*To all whom it may concern:*

Be it known that we, WILLIAM B. SMITH WHALEY and EDWARD P. ROBINSON, both citizens of the United States, residing, respectively, in Newton, county of Middlesex, and State of Massachusetts, and in Malden, county of Middlesex, and State of Massachusetts, have invented an Improvement in Ignition-Timers, of which the following description, in connection with the accompanying drawings, is a specification, like letters on the drawings representing like parts.

The present invention relates to an ignition timer for explosive engines, the purpose of the invention being to arrange the timer so that the traveling contact will stand in such position as to ignite the charge in the cylinder in which the piston is ready to start the engine ahead, regardless of the position in which the engine may come to rest; and to ignite the charge in the following cylinder just after the piston therein has crossed the dead center. By this expedient, any multi-cylinder engine having more than two cylinders can be started by turning on the current, assuming that the explosive mixture is in the proper condition.

A further feature of the invention consists in such a construction of the timer as will render it possible to start in either direction a four-cycle engine having six cylinders, or a two-cycle engine having three cylinders, by shifting the timer member within certain definite limits. In order to produce the results above outlined, the relatively stationary timer contact members are elongated, so that the traveling contact member will remain in contact with one member until it has come into contact with the next member in the series, and a further feature of the invention consists in means for substituting for the elongated contacts the ordinary short contacts after the engine has been started in order to save current.

The invention is shown as embodied in a timer designed for use in connection with a six-cylinder four-cycle self starting and reversing engine, and will be described specifically in this connection, with the understanding that, so far as relates to the self-starting feature alone, the timer is applicable to engines having a fewer number of cylinders.

In a reversing engine of the four-cycle type, it is necessary to shift the cams, or otherwise control the functions of the inlet and exhaust valves of the several cylinders, but, as this construction does not enter into the present invention, it is not necessary to describe any specific means for accomplishing this purpose, it being assumed that the cams are shifted, or the engine otherwise brought into proper condition for reversing either through the agency of the timer actuator, or otherwise.

In a six-cylinder engine having the pistons arranged in pairs and the cranks also arranged in pairs, the pairs being 120° apart around the crank shaft, it is obvious that when the engine comes to rest after ignition has ceased, the most natural position will be with one pair of pistons at the ends of their outstroke, and two pairs of pistons each equidistant from the cylinder heads, and with their cranks 120° inclined in opposite directions. Taking the position of the several pistons with relation to the traveling timer contact, the three pistons ready to act will be in the following relation: The timer contact will stand approximately 30° beyond the normal late sparking point of the cylinder in which the piston would have been traveling outward under the impulse of the explosion had the engine remained running. The piston in this cylinder is on its outstroke for forward action of the engine, and the cylinder contains a partially compressed charge. The piston in the cylinder which would follow this one in the ordinary cycle also contains a partially compressed charge and is in the same position with relation to the cylinder head, but with its pitman inclined in the opposite direction. The piston in the cylinder following this is the one which stands at the bottom with a full charge in the cylinder ready to be compressed during the instroke. Under these conditions, it is obvious that if the timer member is moved in the direction in which it would be moved during the operation of the engine to retard the spark, the contact belonging to the first of the cylinders above enumerated will reach the traveling contact, thus producing an explosion in the said cylinder, which will start the engine ahead. If, on the contrary, the timer member is moved in the opposite direction, until the contact belonging to the next cylinder in the firing sequence reaches the traveling member, the engine will start in the reverse direction. In order to start the engine, therefore, it is necessary only to afford means for moving the timer controlling member through an arc which is a little greater than the distance between two successive contacts thereon. It is obvious, however, that with the ordinary short contacts, the spark in the second cylinder of the firing sequence will occur late, unless the timer is rapidly manipulated to advance the spark as soon as the engine starts. Such manipulation is rendered unnecessary in accordance with this invention, by elongating the timer contacts, and arranging the limits of movement of the timer, so that in the normal late spark position the traveling member will come into contact with the timer segment just after the piston has passed the dead center. Since the elongated contact extends from this point to a point adjacent to the next contact in the series, it is obvious that an explosion will take place regardless of the position of the piston in the cylinder, and will be followed by a comparatively early explosion in the cylinder next following in the firing sequence, since the traveling contact member will reach the next segment when the piston in the cylinder fired thereby is substantially at the top.

While the position above described is that in which the engine will naturally come to rest, it sometimes happens that one of the pistons will come to rets substantially on a dead center at the inner end of the cylinder with the compressed charge behind it. This cylinder will be the second one in the firing sequence, whichever way the engine travels, and the cylinder behind it in the firing sequence will be the one in which the piston is in position to start the engine ahead, while the cylinder beyond it in the sequence will be the one in which the piston is in the position to start the engine in the reverse direction. Both of these pistons, moreover, will be in an unfavorable position, viz., with the cranks only 60° at either side of the lower dead center position, and the charge approximately two-thirds expanded. In this case, however, the traveling timer contact, whether the engine is set for the ahead or everse movement, will be near one end or the other of the elongated distributing contact, so that a very slight movement of the crank shaft will cause said traveling contact to come into engagement with the distributing contact belonging to the next cylinder in the firing sequence, in which cylinder the piston is nearly at the top with a fully compressed charge behind it. The slight crank shaft movement due to the pressure of the charge in the first cylinder, when ignited, is, therefore, sufficient to carry the piston in the next firing cylinder, past the dead center, and to cause the ignition of the charge in said cylinder. Under these conditions it will be seen that if the ignition of the charge in the starting cylinder will produce sufficient pressure to move the piston therein at all, the resulting movement of the crank shaft will bring the second cylinder of the firing sequence into action with full power, thus starting the engine. Since the long contacts are arranged, as previously described, so close together that the ignition circuit cannot be broken through the timer in any position thereof, the insulation being bridged by the traveling contact, it is obvious that the timer cannot be placed in any position in which a spark will not be produced in at least one of the cylinders. Under some circumstances, of course, sparks will occur simultaneously in two successive cylinders, but this is not detrimental in view of the fact that at the time such double ignition occurs the pistons in both of the said cylinders are on their outward stroke. With the engine stationary, for example, substantially in the position above described, but with the second piston of the sequence ten degrees past the dead center, ignition will take place in both the first and second cylinders of the firing sequence, the charges thus acting on the two pistons simultaneously. While a timer provided with elongated contacts of this kind will be available in continuous operation of the machine, and may be utilized to advance or retard the spark in the usual way, it entails a great waste of current, since the circuit is continuously closed during the operation of the engine with a timer operating in this way.

A further feature of the invention, therefore, consists in providing the timer with short contacts and with means for transferring the traveling circuit closer from one set of contacts to the other, as soon as the engine has been started.

It is, furthermore, desirable when the timer is to be used in connection with a six-cylinder reversing engine, to provide the controlling member with a separate device for advancing the spark in the ordinary running of the engine, instead of relying upon the shifting device by which the timer member is moved from one extreme position to the other for ahead or reverse operation of the engine. It is, furthermore, desirable to prevent any possible closure of the circuit when the engine is standing still prior to the positioning of the timer to start the engine in the direction desired. To this end, the timer member is provided with a main operating handle arranged to operate between limits so as to move the timer a distance slightly greater than the distance between adjacent contacts, the said handle also being provided with a locking device and circuit controller so arranged that the circuit can be closed only when the handle is locked in either of its extreme positions. The timer member is also provided with a supplemental handle which can be moved after the engine has been started for the purpose of advancing the spark from the normal late position where it is placed by the main operating handle in order to speed up the engine when in operation. This handle may also be arranged to shift the circuit controller from the long to the short timer contacts, such shifting taking place upon the first movement of the controlling handle from its normal position. In order to insure the stopping of the engine with the timer in the proper position and the long contacts in operation, the secondary controlling handle is so connected with the main controlling handle that it is brought into parallelism therewith by that movement of the main handle which unlatches the same and breaks the circuit to stop the engine. When, therefore, the main controlling handle is operated to stop the engine, the ignition lead, if the engine has been running with ignition advanced, is removed and the timer is left in a fixed normal retarded position with the end of each segment in such a position as to fire a charge ten or fifteen degrees late in the cylinder to which it belongs and this condition cannot be changed by any manipulation of the device, the only operation possible being to shift the main lever across from the ahead to the reverse position, or vice versa, before the engine can be started.

Figure 2:
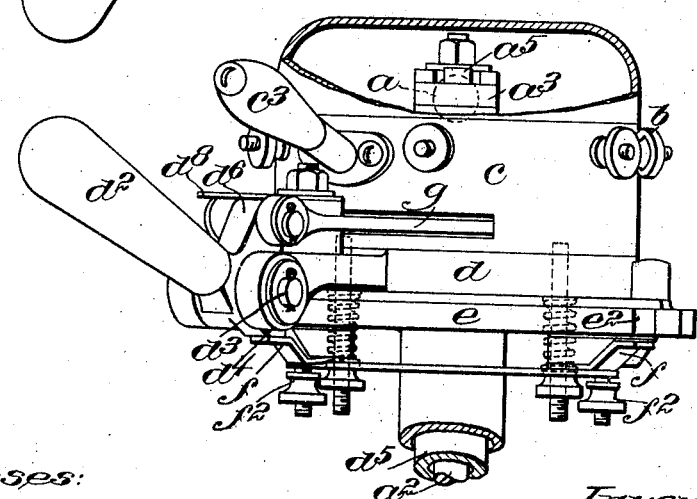

Figure 1 is a top plan view of the timer embodying the invention, with the handles shown in the position to which they are moved when the engine is to be started ahead; Fig. 2 is a front elevation of the same, partly in section; Fig. 3 is a view similar to Fig. 1, showing the position of the timer when the engine is stopped; Fig. 4 is a similar view showing the parts in proper position when the engine is running and the spark is somewhat advanced; Fig. 5 is a horizontal section on line $x^5$ of Fig. 7; Fig. 6 is a horizontal section on line $x^6$ of Fig. 8; Fig. 7 is a vertical section on the line $x^7$ of Fig. 3; Fig. 8 is a vertical section on the line $x^8$ of Fig. 4; Figs. 9 and 10 are detail plan views; Fig. 11 is a diagram showing the positions of the pistons in a six-cylinder engine when the engine comes to a standstill in the most likely position; Fig. 12 is a developed diagram of the distributing contact member of the timer with the position of the traveling contact member shown to correspond to the piston position in Fig. 11 and in position to start the engine ahead; Fig. 13 is a similar diagram of the timer member in position to reverse; Figs. 14, 15 and 16 are diagrams similar to Figs. 11, 12 and 13, but showing the piston positions after the crank shaft has traveled one-half a revolution beyond the position shown in Fig. 11; and Figs. 17 and 18 are similar diagrams showing a four-cylinder engine.

In order that the construction and operation of the timer may be more fully understood, the general operation of the engine will first be described with reference to the diagrams Figs. 11 to 18. As has been previously stated, a six-cylinder engine, unless influenced by abnormal frictions or forces other than those exerted by the expansion of the compressed contents of the cylinders, will naturally come to rest in the position shown in Fig. 11, in which cylinder 1 is assumed to be that in which the charge would be firing if the engine were running. Cylinder 2, the next in the firing sequence, would, in this case, be compressing, while cylinder 3 would be charged with gas and about to begin its compression stroke. In these three cylinders all the valves will be closed, and it is obvious, therefore, that, since the piston in cylinder 1 was traveling outward when it stopped, while the piston in cylinder 2 was traveling inward, while the cylinders corresponding to said pistons each contains a full charge, these two pistons naturally come to a balance, while the piston in cylinder 3 will tend to remain at the end of its outstroke, since its inward movement would be resisted by the force necessary to compress the charge contained therein. This being the condition, the traveling timer contact $a$ would have passed the initial firing position for cylinder 1, it being obvious, therefore, that in order to start the engine ahead, it is necessary only that the distributing member of the timer should be in such a position that the traveling contact $a$ is in engagement with the distributing contact $1^b$ as shown in Fig. 12, while, to reverse the engine, the distributing member must be in such a position that the member $a$ is in contact with the member $2^b$. If, however, the ordinary small contacts are employed, it is obvious that the late position of the sparking contact necessary to ignite the charge in cylinder 1 will be followed by a correspondingly late sparking position in the successive cylinders unless the timer member is rapidly manipulated to advance the spark after the engine has been started. In order to obviate the necessity of such manipulation and to render the operation entirely automatic, the distributing member of the timer is arranged, as shown, with long contacts, separated only by narrow strips of insulation to insure the distribution of the current, the said strips being shown as so narrow as to be bridged by the traveling contact member when it passes from one distributing contact to the next, so that the ignition circuit is continuously closed; and in a reversing engine the said timer member is provided with an operating handle arranged to travel through an arc slightly greater than the distance between successive points of ignition, the arrangement being such that when the engine is at a stand-still, the relation of the timer member to this handle is fixed and unchangeable. The position of the distributing member with relation to the said handle is such that when the handle is moved to either extreme, the distributing contact will be so related to the traveling contact as to close the circuit in each succeeding cylinder in the normal late sparking position approximately ten or fifteen degrees past the dead center. In the construction shown in the drawings, the late sparking position controlled by the main operating handle is indicated as approximately ten degrees past the dead center. When, therefore, the distributing member is in this position, it is immaterial what position the first piston is in when the charge is ignited, since ignition will take place in the next cylinder near the beginning of the outstroke. Assuming, for example, that the engine is to be started ahead, the distributing member will stand approximately in the position shown in Fig. 12 in which the member $a$ is in contact with the member $1^b$, so that upon closing the circuit the charge in cylinder 1 will be fired.

The movement of the member $a$ in the direction of the arrow brings it into contact with the member $2^b$ just after the piston in cylinder 2 has begun its outstroke, so that the full expansive effect of the charge is obtained in that cylinder followed by the same effect in the following cylinders in the sequence. If the engine is to be reversed, the distributing member is moved to such a position as to bring it into that relation to the member $a$ indicated in Fig. 13, thus producing an explosion in cylinder 2 which is followed by an explosion in cylinder 1, and then 6, 5, 4, 3, &c.

It is assumed that means are provided for reversing the functions of the valves, when the engine is reversed, the exhaust valves of cylinders 6 and 5 being closed, instead of open, as shown, while the inlet valve of cylinder 4 is closed, instead of open. Since the engine in stopping makes two or three revolutions, it is obvious that all the exhaust gases will have been cleared out, and that each cylinder will contain fresh gas, so that cylinder 6 will be charged with fresh gas ready to be compressed as the engine starts with the valves in said cylinder closed.

It sometimes happens that the engine will not stop in the position above described, but may stop advanced one-half a revolution, as shown in Fig. 14, or, of course, there may be some intermediate position, but so far as relates to the relation between the timer and the cylinders, these two positions may be regarded as extremes, and any intermediate position will be taken care of, as may be readily seen by reference to the diagram. Assuming, however, that the engine has stopped in the position shown in Fig. 14, the piston belonging to cylinder 1 will have completed its outstroke and will have begun its instroke with its exhaust valve open, and cylinders 2 and 4 will have their valves closed and their pistons substantially balanced with the pitmen inclined in opposite directions, but with their cranks 120° from the top, instead of 60° as is the case with cylinders 1 and 2 in Fig. 11. Cylinder 3 will have both its valves closed, its piston at the top of the stroke, and a charge under full compression behind the piston. The timer contact $a$ will, when the distributing member of the timer is moved to its initial starting position above described, be in engagement, as shown in Fig. 15, with the contact member $2^b$ ready to ignite the charge in cylinder 2. While the piston in cylinder 2 is in an unfavorable position, a very slight impulse will suffice to start the engine ahead, since the piston in cylinder 3 is on a balance with the tendency of the compressed charge ready to force it outward as soon as the pitman is thrown off the dead center. A slight movement of the timer contact $a$, moreover, brings it into engagement with the distributing contact $3^b$, so that the compressed charge in the cylinder 3 is ignited at once, thus giving a full starting impulse to the engine, as above described. To reverse the engine, the distributing member is moved to its extreme opposite position, the arc of movement, as above described, being slightly greater than the distance between successive ignition points, the result being that the member $a$ will come into contact with the member $4^b$, as shown in Fig. 16, thus starting the engine in the opposite direction, the explosion in the cylinder 4 being immediately followed by one in cylinder 3, the sequence then continuing 2, 1, 6, 5, &c.

After the engine has been started, a separate manipulating device, which will be hereinafter described, is employed to bring the short contact members $1^B$, $2^B$, &c., into operative position, and the timer is provided with a suitable manipulating device for advancing and retarding the spark independent of the initial positioning devices therefor for starting the engine, so that no unnecessary current is expended.

While the timer herein shown is especially designed and adapted for use in a six-cylinder self-starting and reversing engine, the same principle, so far as relates to the long and short contacts, may be employed for the purpose of starting a non-reversible engine having a fewer number of cylinders. In this case, as indicated in Fig. 18, the short contacts $1^B$, $2^B$, &c., are located at the initial ends of the long contacts, instead of being located in the middle thereof, since the operation of advancing and retarding the spark is carried on with relation to the travel of the engine in one direction only.

In the construction shown, for use with the six-cylinder reversing engine, the long and short distributing contacts $1^b$, $2^b$, $1^B$, $2^B$, &c., Fig. 1, are each formed in one piece, the short contacts consisting of projections located at the middle of each contact piece, the outer edge of which is preferably inclined toward said projection, so that the traveling contact member $a$ which is arranged to be moved from the long to the short contacts, will cause a gradual transfer from one to the other. These contacts are mounted in the usual way upon an insulating support $c$ which is frictionally held upon an oscillating member $d$ provided with a handle $d^2$ which is movable along a guide segment $e$ having limiting members shown as recesses $e^2$ at opposite ends, the distance between the limits being such that the member $d$ will be shifted by the movement of the handle $d^2$ a distance slightly greater than the distance between the initial firing points of any two successive cylinders. The arrangement is such that the ignition circuit is controlled by the handle $d^2$, and can only be closed when the said handle is in one or the other of the extreme positions, the said handle being shown as having a pivotal support $d^3$, and a tail or projection $d^4$ which is arranged, when the handle has been moved to either extreme position and then rocked on its pivot, to lock in the slot $e^2$ and to engage an electrical contact member $f$ located below the said slot, as shown in Fig. 2. The handle $d^2$ is also acted upon by a retaining spring $d^8$. The electrical connections are not herein shown, the contacts $f$, however, being provided with binding screws $f^2$ to connect with the ground wire, while the contact members $1^b$, &c., are provided with binding screws $b$ to receive the distributing wires leading to the coil. In the construction shown, (Fig. 7) the member $d$ is shown as provided with a sleeve $d^5$ which surrounds the rotating shaft $a^2$ which carries the traveling contact member $a$, it being practicable to utilize this shaft as a mechanical device for shifting the valves in a reversing engine in which the valves are shifted mechanically.

It will be seen from the foregoing description that the engine cannot be started in either direction until the handle $d^2$ is engaged in one or the other of the notches $e^2$, and so long as the timer contacts are held in proper relation to the said handle, ignition will take place in the successive cylinders at the desired period of the stroke, in order to keep the engine running. It is desirable, however, to maniplate the spark in running the engine, and also to utilize the short contacts for the purpose of saving current. To this end, the member $c$ is movable with relation to the member $d$, such independent movement, however, being prevented when the handle $d^2$ is in any position other than those permitted by the notches $e^2$. In the construction shown, the member $c$ is positioned in the member $d$ by means of a flange surrounding the said member, but is capable of being oscillated independently therefrom. The said member $c$, however, is under the control of the handle $d^2$ through the agency of a yoke $g$ connected with an arm $d^6$ on the handle $d^2$, the depression of the said handle to release the part $d^4$ from the notch $e^2$ causing a longitudinal movement of the said yoke in which movement the said yoke engages one or the other of a pair of oppositely disposed pins or projections $c^2$ on the member $c^4$ which is connected with the member $c$, as hereinafter described, thus turning the member $c$ back to its initial position, regardless of the position to which it has been moved by the independent handle $c^3$, with which it is provided for the purpose of manipulating the spark after the engine has been started. In stopping the engine, therefore, it is necessary, in order to break the circuit, to depress the handle $d^2$, this operation bringing the timer member $c$ back to its normal position with the handle $c^3$ in line with the handle $d^2$, as indicated in Figs. 3, 5 and 7, and the parts cannot be moved from this position so long as the handle $d^2$ is in any intermediate position, since the segment $e$ along which the said handle travels, prevents the upward movement of the handle $d^2$ to the position shown in Figs. 1, 2 and 8. Referring to Figs. 5 and 6, the latter shows the parts as if the engine were running and the spark advanced, the position being the same as that shown in Fig. 4. Upon depressing the handle $d^2$, however, to stop the engine, the yoke $g$ is moved, in this case acting upon the right hand pin $c^2$, and rotating the member $c$ until it is brought to the position relative to the yoke which is shown in Fig. 5. As long as the handle $d^2$ is depressed therefore, the yoke will prevent any independent movement of the member $c$, which is then wholly controlled by the handle $d^2$.

In order that the transition from the long contacts to the short contacts may be substantially automatic, the independent movement of the handle $c^3$, which cannot take place until after the engine has been started, since the yoke is not until then moved out of the way of the stops $c^2$, is employed to shift the traveling contact member $a$, as well as to advance or retard the spark. In the construction shown, the said member $a$ is connected with a sliding yoke $a^3$ at the top of the rotating half time shaft $a^2$, so that it is capable of being moved from the position shown in Fig. 3, in which it engages the long portion $1^b$, etc., of the contacts to the position shown in Fig. 4, in which it will clear the said long portions and engage the short portions $1^B$, etc., only.

The movement from the long to the short portions is provided for by means of a spring $a^4$, Figs. 7 and 8, while the movement in the opposite direction is produced by means of a lever $a^5$ engaging at its upper end the yoke $a^3$ and having a tail $a^6$ which rests upon a vertically movable member $c^4$ which is connected by a spline $c^5$ with the member $c$. This member $c^4$ is provided along its lower surface, as shown in Figs. 7, 8 and 9, with projections $c^6$ which are arranged to ride up the inclined edges of raised surfaces $d^7$ formed on the base of the member $d$, these inclined surfaces coöperating with each other just before the handle $c^3$ is moved by the yoke $g$ into alinement with the handle $d^2$. When, therefore, the handle $c^3$ is in alinement with the handle $d^2$ (Figs. 3, 5 and 7) the projections $c^6$ rest on the raised surfaces $d^7$, thus holding the member $c^4$ raised, and, through the agency of the lever $a^5$, holding the contact member $a$ in position to engage the long contacts. After the handle $c^3$ has been released by the upward movement of the handle $d^2$ in starting the engine, i. e., freed from the yoke $g$, the initial movement of said handle $c^3$ away from the starting position to control the spark, will disengage the projections $c^6$ from the surfaces $d^7$, as shown in Figs. 6 and 8, and release the lever $a^5$ in consequence of the downward movement of the member $c^4$ through the action of the spring $c^7$, thus permitting the member $a$ to move outward through the influence of the spring $a^4$ to the position shown in Figs. 4 and 8, where it will engage the short contacts only.

From the foregoing description, it will be seen that with a timer constructed in this way it is impossible to start the engine unless the initial position of the timer is such as to produce the desired result, there being no possibility of back firing, and no possibility of making any mistake in the direction in which the engine is to be operated. The separate parts of the distributing member of the timer are locked together in the proper position whenever the main actuating handle $d^2$ is moved for the purpose of stopping the engine, and it is impossible to change this relation until after the engine has been started. Furthermore, the employment of the long contacts insures the positive starting of the engine in either direction.

Claims.

1. An ignition timer provided with a traveling contact member having two different paths of movement, and distributing contacts having parts insulated from each other, but extending entirely throughout one path of the movement of the traveling contact member, and having other parts which are widely separated from each other, and which lie in the other path of movement of the traveling contact member; and means for shifting the traveling contact member from one of these paths of movement to the other.

2. In an ignition timer, the combination with the traveling contact member; of the distributing contact member; distributing contacts carried by said distributing contact member, each having a long and short contact portion; and means for shifting the position of one of said contact members with relation to the other to cause the traveling contact member to engage the short contact portions only of the distributing contact member when the engine is running.

3. In an ignition timer, the combination with a traveling contact; of a set of distributing contacts the conducting portion of which set of contacts extends along the entire path of travel of the traveling contact, in electrical contact therewith, the several contacts being insulated from each other; a movable member carrying said distributing contacts; and means for shifting said movable member a distance slightly greater than the distance between alternate distributing contacts.

4. In an ignition timer, the combination with the traveling contact member; of a distributing contact member; a main operating handle for said distributing member; means operated by said handle for preventing ignition from taking place; and connecting mechanism whereby the movement of said handle which prevents ignition also sets the timer in position for late ignition.

5. In an ignition timer, the combination with the traveling contact member; of a distributing contact member; a main operating handle for said distributing member having a limited movement between stops; means for preventing the operation of the engine except when said main handle is at one extreme or the other of its limited movement; and a supplemental handle for said distributing contact member capable of being operated only when the engine is running.

6. In an ignition timer, a traveling contact; a distributing contact member; a main operating handle therefor movable from one extreme position to another, said handle being capable of a secondary movement only when it is in either extreme position; and connecting mechanism between said distributing member and said handle whereby said secondary movement of said handle brings said distributing member to a definite predetermined position with relation thereto.

7. In an igniting timer, a distributing member frictionally held on an oscillating base; a handle pivotally connected with said base; a segment provided with openings forming stops for said handle; and connecting mechanism between said handle and said distributing member acting on said distributing member when said handle is moved out of said openings and being freed from said handle when said handle is moved into said openings, whereby an independent movement of said distributing member is permitted when said handle is in either opening.

8. The combination with a distributing member frictionally held on an oscillating base; of a handle pivotally connected with said base; a controlling segment for said handle provided with locking notches at opposite ends; contact members below said locking notches to close the circuit when the handle is moved into either notch; and means whereby an independent movement of the distributing member is permitted only when said handle is in either notch.

9. The combination with a distributing member provided with contacts having long and short contact portions; a traveling contact member movable from the path of the long contacts to the path of the short contacts; an operating handle; switch contacts operated by said handle whereby the circuit through the timer is closed or broken by the movement of the handle; a connecting device between said handle and said distributing member to positively act on said member when said handle is moved in one direction, and to release said member when said handle is moved in the opposite direction; and means responsive to the independent movement of said distributing member for shifting the traveling contact member between the long and short contact portions.

10. The combination with a distributing member frictionally mounted on an oscillating base; a handle pivotally connected with said base; a yoke connected with said handle and longitudinally movable in response to the movement of said handle on its pivotal connection; engaging members on said distributing member adapted to be acted upon by said yoke; and a circuit controller also operated by the movement of said handle on its pivot.

11. The combination with a distributing member; of a main operating handle to move said distributing member to the proper position for starting or reversing; locking recesses for said handle in each position; means for opening the circuit through the timer when said handle is moved out of either locking recess; and means for freeing said distributing member from the control of said main operating handle, in response to the movement thereof into either recess.

12. The combination with a distributing member provided with long and short contacts; of a handle for operating said member having a pivotal movement whereby it is locked in its initial position; a connecting device between said distributing member and said handle for bringing said distributing member to a predetermined position with relation to said handle by an unlocking movement thereof; means for releasing said distributing member from the control of said handle by the locking movement thereof; cam surfaces on the handle member; a member connected with the distributing member and operated by said cam surfaces; a traveling contact member; and a lever controlled by the member operated by said cams to shift the traveling contact member between the long and short contacts aforesaid.

13. In an igniting timer, the combination with an oscillating disk; of an actuating handle pivotally connected therewith; a segment provided with locking notches at opposite ends and so located as to permit the movement of said disk only when said handle is disengaged from said notches; a distributing member frictionally held on said disk; means connected with said handle for bringing said distributing member to a predetermined position with relation thereto when said handle is moved to disengage it from the locking notch; and means for producing an independent movement of said distributing member when said handle is in one of the locking notches.

14. An ignition timer provided with a main actuating device adapted to move the distributing member of said timer to either of two predetermined positions; combined with means for releasing said distributing member from the control of said main actuating member after it has been thus moved.

15. An ignition timer provided with a distributing member; a main actuating device therefor adapted to move said member to either of two predetermined positions; and means whereby a further movement of said actuating device when in either of said positions closes the circuit through the timer and releases said distributing member from the control of said main actuating member.

16. In an ignition timer, a traveling contact; a set of distributing contacts extending throughout the entire path of travel of the traveling contact, but being insulated from each other; a set of distributing contacts widely separated from each other; and means for causing the traveling contact to close the circuit through either of said sets of distributing contacts to the exclusion of the other.

In testimony whereof, we have signed our names to this specification in the presence of two subscribing witnesses.

WILLIAM B. SMITH WHALEY.
EDWARD P. ROBINSON.

Witnesses:
   GEO. W. MOSES,
   LINVELLE H. HIGGINS.

Copies of this patent may be obtained for five cents each, by addressing the "Commissioner of Patents, Washington, D. C."